United States Patent
Inagaki et al.

(10) Patent No.: US 10,598,287 B2
(45) Date of Patent: Mar. 24, 2020

(54) COMPOSITE SEAL RING

(71) Applicant: DENSO CORPORATION, Kariya, Aichi-pref. (JP)

(72) Inventors: Noriyuki Inagaki, Kariya (JP); Shuya Mikami, Kariya (JP); Yushi Tsuzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/033,328

(22) Filed: Jul. 12, 2018

(65) Prior Publication Data

US 2019/0063612 A1  Feb. 28, 2019

(30) Foreign Application Priority Data

Aug. 22, 2017 (JP) .................. 2017-159189

(51) Int. Cl.
*F16J 15/34* (2006.01)
*F16J 15/44* (2006.01)
*F16K 1/226* (2006.01)

(52) U.S. Cl.
CPC ....... *F16J 15/3452* (2013.01); *F16J 15/3496* (2013.01); *F16J 15/441* (2013.01); *F16K 1/2261* (2013.01)

(58) Field of Classification Search
CPC ............... F16J 15/3452; F16J 15/3496
See application file for complete search history.

(56) References Cited

U.S. PATENT DOCUMENTS

| 1,556,312 | A | * | 10/1925 | Davis | F16J 9/063 |
| | | | | | 277/476 |
| 2,170,970 | A | * | 8/1939 | Johnston | F16J 9/20 |
| | | | | | 277/453 |
| 4,130,285 | A | * | 12/1978 | Whitaker | F16K 5/0673 |
| | | | | | 137/67 |
| 4,477,057 | A | * | 10/1984 | Friess | F16K 1/2285 |
| | | | | | 251/306 |
| 4,593,916 | A | * | 6/1986 | Laulhe | F16K 1/226 |
| | | | | | 251/306 |
| 2002/0163136 | A1 | * | 11/2002 | Schroeder | F16J 15/166 |
| | | | | | 277/549 |
| 2009/0020099 | A1 | | 1/2009 | Bessho et al. | |
| 2017/0227130 | A1 | | 8/2017 | Kohlen et al. | |

FOREIGN PATENT DOCUMENTS

JP       2016-211678       12/2016

* cited by examiner

*Primary Examiner* — Gilbert Y Lee
(74) *Attorney, Agent, or Firm* — Nixon & Vanderhye PC

(57) ABSTRACT

A composite seal ring has a resin seal ring and a metal spring. The resin seal ring is attached in an outer peripheral groove of a valve that opens and closes a passage by a rotational displacement, and the resin seal ring seals between an inner wall of a passage portion that forms the passage and the valve, in the fully closed state of the valve. A metal spring is circularly disposed within a radial width of the resin seal ring. The spring is configured to press the resin seal ring radially outwardly and radially inwardly due to the pressure acting on the resin seal ring or a deformation of the resin seal ring.

17 Claims, 13 Drawing Sheets

VALVE OPENED

COMPOSITE SEAL RING

CROSS REFERENCE TO RELATED APPLICATION

The present application is based on Japanese Patent Application No. 2017-159189 filed on Aug. 22, 2017, disclosure of which are incorporated herein by reference.

FIELD

The present disclosure relates to a composite seal ring in which a metal spring is combined with a resin seal ring.

BACKGROUND

In a conventional butterfly valve type valve device used for opening and closing a passage through which exhaust gas recirculation (hereinafter referred to as "EGR") gas or the like flows, a seal ring which is mounted in an outer peripheral groove of a valve and seals a gap between an outer peripheral wall of the valve and an inner wall of a passage portion is known.

In the conventional valve device, an environmental temperature of the gas passage portion extends over a wide range from a low temperature in a state left in a cold district to a high temperature exposed to the exhaust gas. In addition, since the materials of the valve, the seal ring, the nozzle constituting the gas passage portion and the like are different from each other, a clearance is set based on considering the difference in linear expansion of each material.

For example, in the valve device disclosed in Patent Document 1, a seal ring made of resin is used in place of a metal seal ring commonly used before that. In the case of using the metal seal ring, an inner circumferential sliding surface of the gas passage portion, which is a mating side of the seal ring, is required to secure hardness by surface treatment or the like for preventing abrasion, whereas it is not necessary in the case of using the resin seal ring. Therefore, it is possible to simplify the abolishment of the surface treatment of the gas passage portion and the like.

PRIOR ART LITERATURES

Patent Document 1: Japanese Patent Publication No. 2016-211678

SUMMARY

Although the resin seal ring can ensure sealing performance by elastic deformation, it has a disadvantage of insufficient rigidity at high temperature. Therefore, when the valve is opened, the seal ring receives an internal pressure and is elastically deformed in the radially outward direction, and therefore may drop out from the outer peripheral groove of the valve. If the fallen seal ring bites between the valve and the passage portion, the seal ring may be broken or the valve may be locked.

In addition, the high temperature creep of the resin lowers the tension of the seal ring, the sealing surface pressure with the passage portion decreases, and the sealing failure may result.

The present disclosure has been made in view of the above problems, and an object thereof is to provide a composite seal ring that prevents dropping out from the outer peripheral groove of the valve due to the internal pressure and secures a tension after high temperature creep.

According to one aspect of the present disclosure, a composite seal ring has a resin seal ring and a metal spring.

A resin seal ring is attached in an outer peripheral groove of a valve that opens and closes a passage by a rotational displacement, and the resin seal ring seals between an inner wall of a passage portion that forms the passage and the valve, in a fully closed state of the valve.

A metal spring is disposed within a radial width of the seal ring, and the metal spring is configured to press the seal ring radially outwardly and radially inwardly due to pressure acting on the seal ring or a deformation of the seal ring.

For example, the spring is housed in a spring groove which is formed on one end surface in an axial direction of the seal ring. Alternatively, at least a part of the spring is embedded in the seal ring.

In the composite seal ring of the present disclosure, rigidity against internal pressure and tension at high temperature can be secured by setting the free diameter and tension of the metal spring combined with the resin seal ring. Therefore, it is possible to preferably solve the problems of the resin seal ring in the prior art, "dropping out from the valve outer circumferential groove due to the internal pressure" and "decrease in tension after high temperature creep" at the time of high temperature at which resin rigidity is lowered.

DETAILED DESCRIPTION

Hereinafter, a plurality of embodiments of the composite seal ring will be described with reference to the drawings. In the plurality of embodiments and the comparative example, substantially the same configuration is denoted by the same reference numeral, and description thereof is omitted. In addition, the following first to sixth embodiments are generically referred to as "present embodiment".

In the present specification, the "composite seal ring" means a seal ring formed by combining a resin seal ring with a metal spring. The composite seal ring of the present embodiment is applied to a valve device that performs to open and close the passage of the EGR gas and adjusts an opening degree, in the EGR system that recirculates part of the exhaust gas to an intake passage.

[Configuration of Valve Device]

Figure 1:
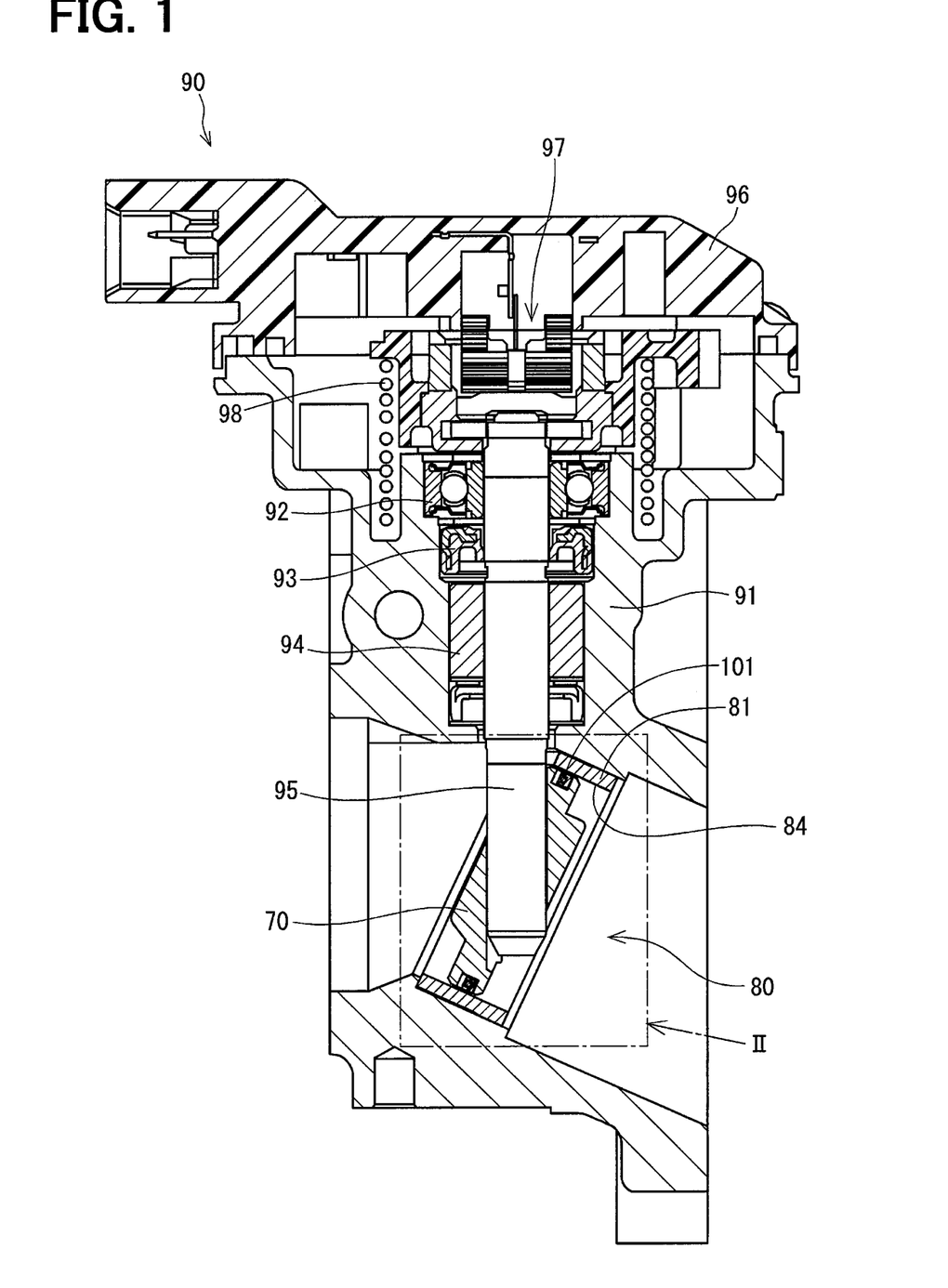
FIG. 1 is a diagram illustrating a schematic view of an EGR valve device in a first embodiment.
Figure 2:
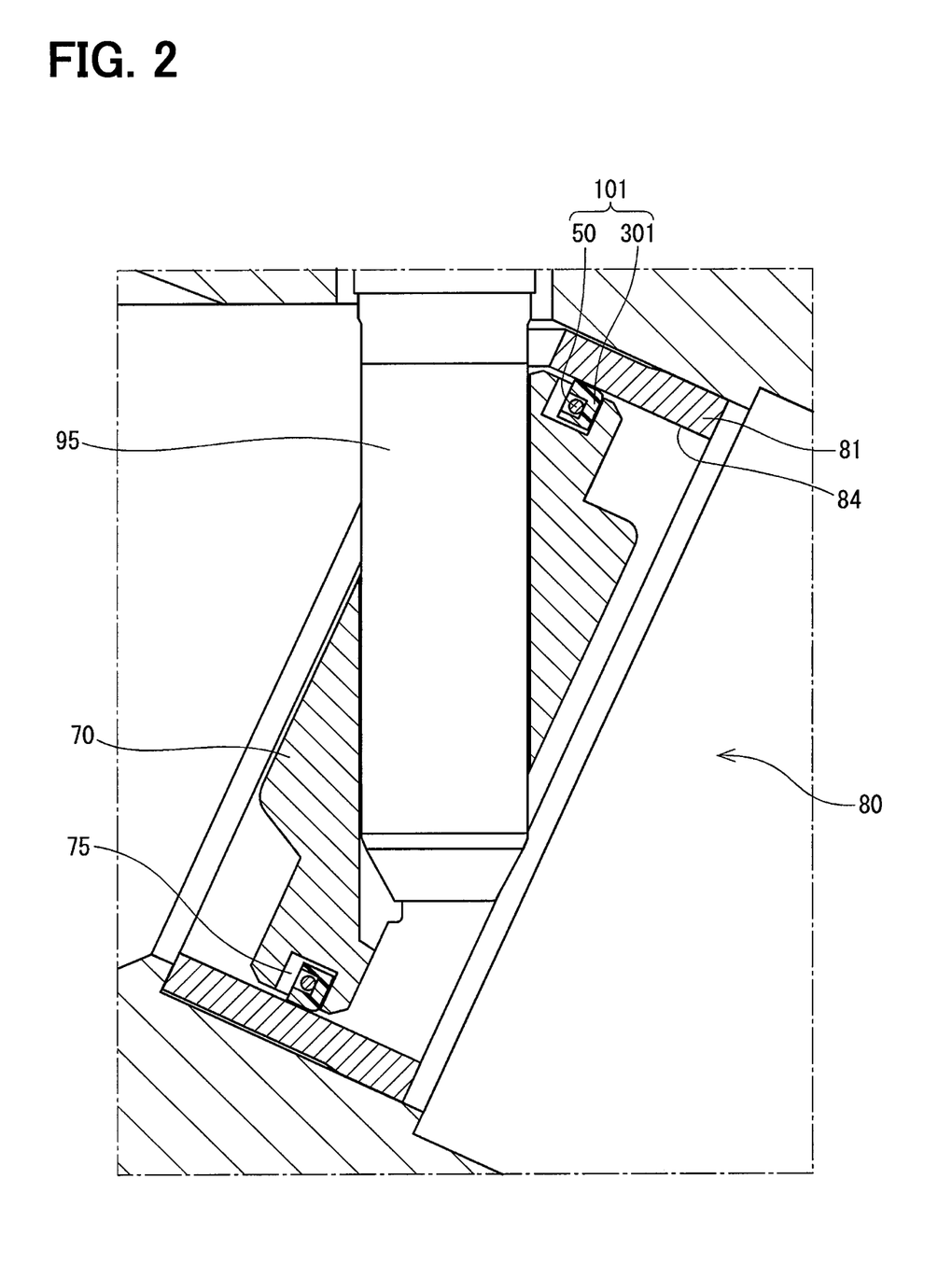
FIG. 2 is a diagram illustrating an enlarged cross sectional view of II part in FIG. 1.

FIG. 1 and FIG. 2 show a schematic configuration of a valve device. Since an outline of the valve device is similar to that described in Patent Document 1 (Japanese Patent Publication No. 2016-211678), a detailed description thereof will be omitted and it will be briefly described. In FIGS. 1 and 2, the composite seal ring is shown as a representative of the composite seal ring 101 of the first embodiment.

The valve device 90 includes a housing 91 having a passage 80 for the EGR gas, a valve 70 which is rotatable integrally with the shaft 95 inside the housing 91, and which is a butterfly valve for opening and closing the passage by a rotational displacement, and a sensor case 96, etc.

Among the portions forming the passage 80 in the housing 91, a portion where the valve 70 rotates is referred to as a passage portion 81. As shown in FIGS. 1 and 2, the passage portion 81 is constituted by the nozzle inserted in the hole of the housing 91, and the inner wall of this nozzle corresponds to "the inner wall of the passage portion 81".

For example, the housing 91 is made of die cast aluminum alloy, and the nozzle is made of stainless steel or the like, which is excellent in heat resistance and corrosion resistance.

The shaft 95 is rotatably supported by bearings 92, 94 provided in the housing 91. A seal member 93 is provided between the bearing 92 and the bearing 94. The shaft 95 is rotated while the rotation of the motor (not shown) is decelerated and transmitted.

The valve 70 is fixed to a distal end portion of the shaft 95 so as to be inclined with respect to the axis of the shaft 95, and adjusts the opening degree of the passage 80 by integrally rotating with the shaft 95.

The sensor case 96 accommodates a rotation angle sensor 97 for detecting the opening degree of the valve 70 by detecting the rotation angle of the shaft 95. The return spring 98 urges the valve 70 toward the valve closing direction.

The valve 70 is formed as a disc shape, and an outer peripheral groove 75 having a rectangular cross section is formed over the entire circumference of the outer peripheral edge. In the outer peripheral groove 75, a composite seal ring 101 formed by combining a resin seal ring 301 with a metal spring is accommodated.

The seal ring 301 is a flat ring formed of a resin material such as PPS, PTFE, PEEK or the like. The seal ring 301 is elastically deformable and seals between the valve 70 and the inner wall 84 of the passage portion 81 when the valve 70 is fully closed.

The spring 50 is formed of a metal wire material having a spring property and is annularly arranged within a range of the radial width of the seal ring 301.

However, according to each embodiment, the detailed configuration in which the spring 50 is disposed within the radial width of the seal ring is different. Hereinafter, the detailed configuration and operation and effect of the composite seal ring will be described for each embodiment. The reference numerals of the composite seal ring and the resin seal ring in each embodiment are assigned to the third digit following "10" and "30", respectively.

First Embodiment

Figure 3A:
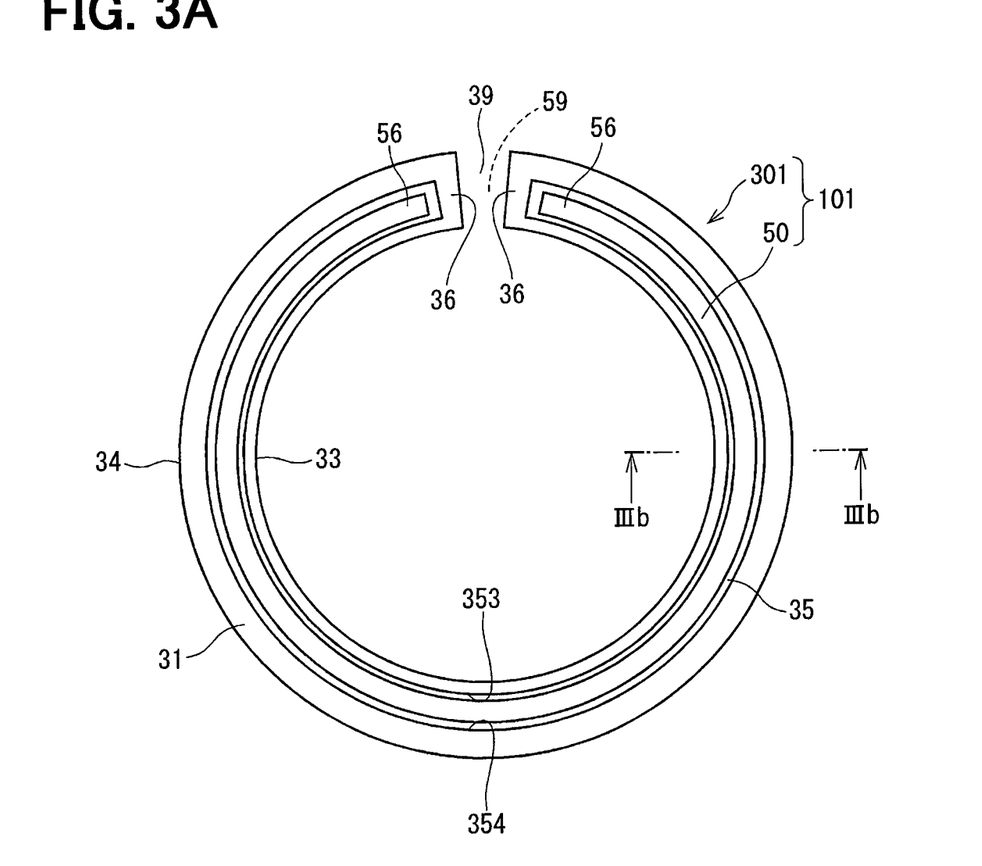
FIG. 3A is a diagram illustrating a front view of a composite seal ring in the first embodiment.
Figure 3B:
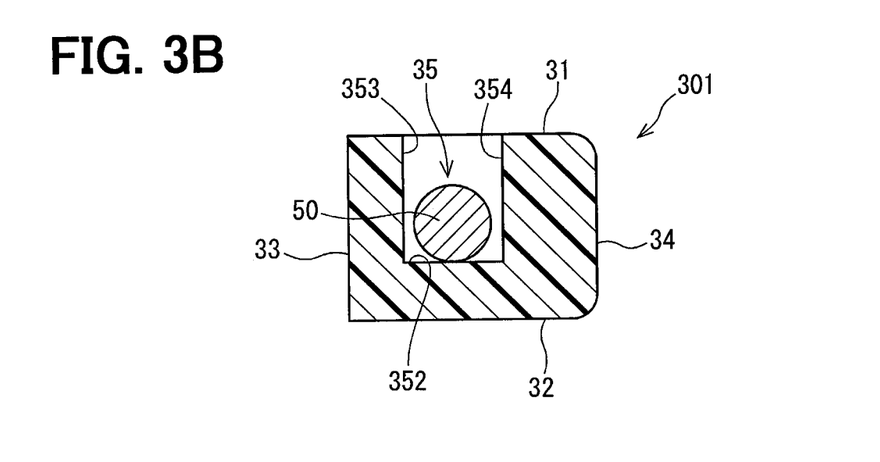
FIG. 3B is a diagram illustrating an enlarged cross sectional view taken along line IIIb-IIIb in FIG. 3A.

With reference to FIG. 3A and FIG. 3B, the configuration of the composite seal ring 101 of the first embodiment will be described. In the composite seal ring 101 in the first embodiment, a spring 50 is accommodated in a spring groove 35 formed in one axial end surface 31 of the seal ring 301.

The cross section in an axial direction of the seal ring 301 is a substantially rectangular shape surrounded by one end surface 31, the other end surface 32, the inner circumferential surface 33, and the outer circumferential surface 34 in the axial direction, and the spring groove 35 is formed on one end surface 31. The spring groove 35 has a groove bottom wall 352, a radially inner groove inner wall 353, and a radially outer groove inner wall 354, and is formed so as to be able to house the spring 50. The spring 50 is housed in the spring groove 35 so as to be annularly arranged within the radial width of the seal ring 301.

In addition, the seal ring 301 has a fitting opening 39 for enlarging and contracting the diameter in one place in the circumferential direction. In FIG. 3A, the fitting opening 39 is illustrated in a shape in which the ring is simply divided. In practice, however, the fitting opening 39 may be formed in a shape in which both circumferential end portions overlap in the radial direction and the axial direction as in the shape of FIG. 2 of Patent Document 1 or the sixth embodiment described later.

When assembling the seal ring 301 into the valve outer peripheral groove 75, the operator temporarily increases the diameter by separating the fitting opening 39 by elastic deformation and inserts it into the outer peripheral groove 75. After the insertion, the diameter of the seal ring 301 decreases. In addition, when the seal ring 301 is used in the valve device 90, the seal ring 301 expands in diameter due to the pressure of the gas and the fitting opening 39 is further separated, but when the valve is fully closed, the fitting opening 39 is formed so as to close a gap of the fitting opening 39.

In the seal ring 301 in the first embodiment, the circumferential end wall 36 that seals the spring groove 35 is formed at both circumferential end portions facing the fitting opening 39.

The spring 50 has a fitting opening 59 at one position in the circumferential direction, and the position of the circumferential end portion 56 facing the fitting opening 59 is regulated by the circumferential end wall 36 in a state of being accommodated in the spring groove 35. Therefore, the fitting opening 39 of the seal ring 301 and the fitting opening 59 of the spring 50 are arranged at the same position in the circumferential direction.

With this configuration, in the composite seal ring 101 of the first embodiment, the circumferential rotation, that is, the relative movement of the spring 50 with respect to the seal ring 301 is suppressed. Therefore, the abrasion of the seal ring 301 due to sliding of the spring 50 is suppressed.

Next, the effect of the composite seal ring 101 of the first embodiment will be described while comparing with the resin seal ring of the comparative example.

Figure 11A:
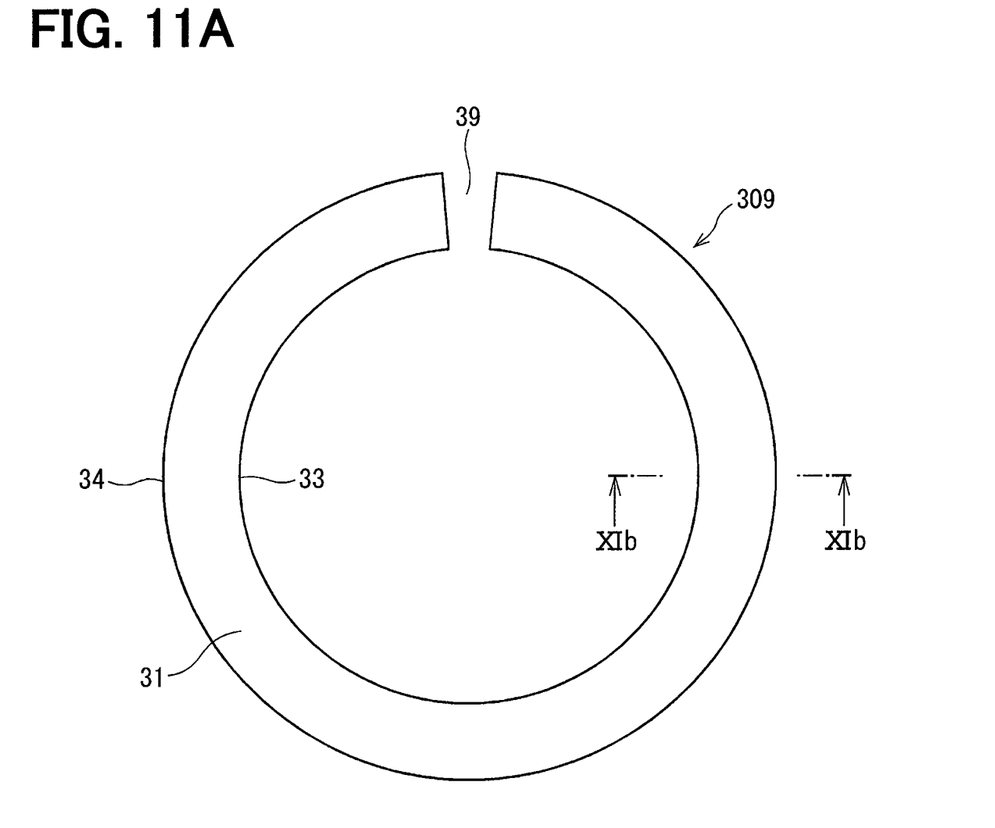
FIG. 11A is a diagram illustrating a front view of a resin seal ring in a comparative example.
Figure 11B:
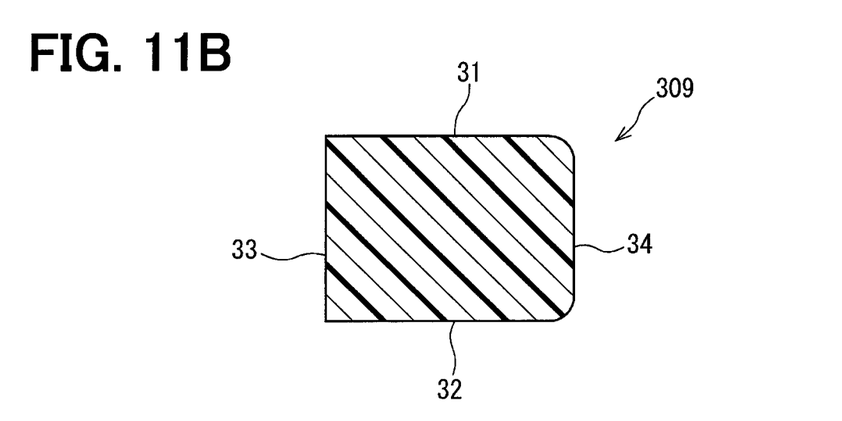
FIG. 11B is a diagram illustrating an enlarged cross sectional view taken along line XIb-XIb in FIG. 11A.

As shown in FIGS. 11A and 11B, the resin seal ring 309 is not provided with the spring groove 35 in comparison with the seal ring 301 of the first embodiment, and the resin seal ring 309 has a simple substantially rectangular in a cross section.

FIGS. 12A, 12B, 13A and 13B show the problems generated when the resin seal ring 309 is applied for the valve device 90.

Figure 12A:
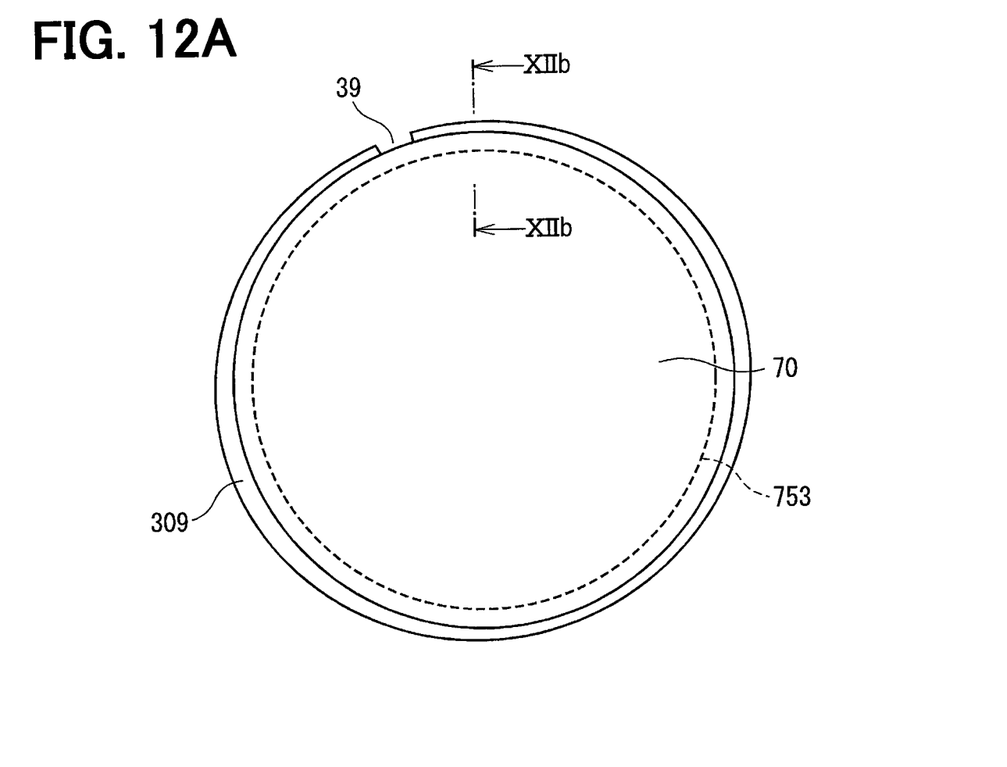
FIG. 12A is a diagram illustrating a front view for explaining an action of deforming the resin seal ring due to insufficient rigidity.
Figure 12B:
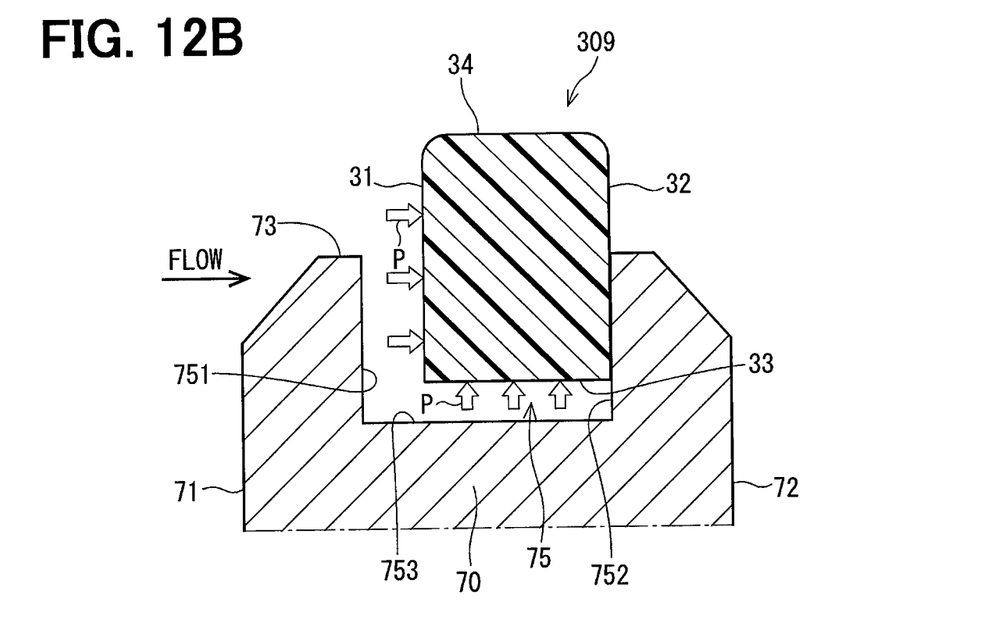
FIG. 12B is a diagram illustrating an enlarged cross sectional view taken along line XIIb-XIIb in FIG. 12A.
Figure 13A:
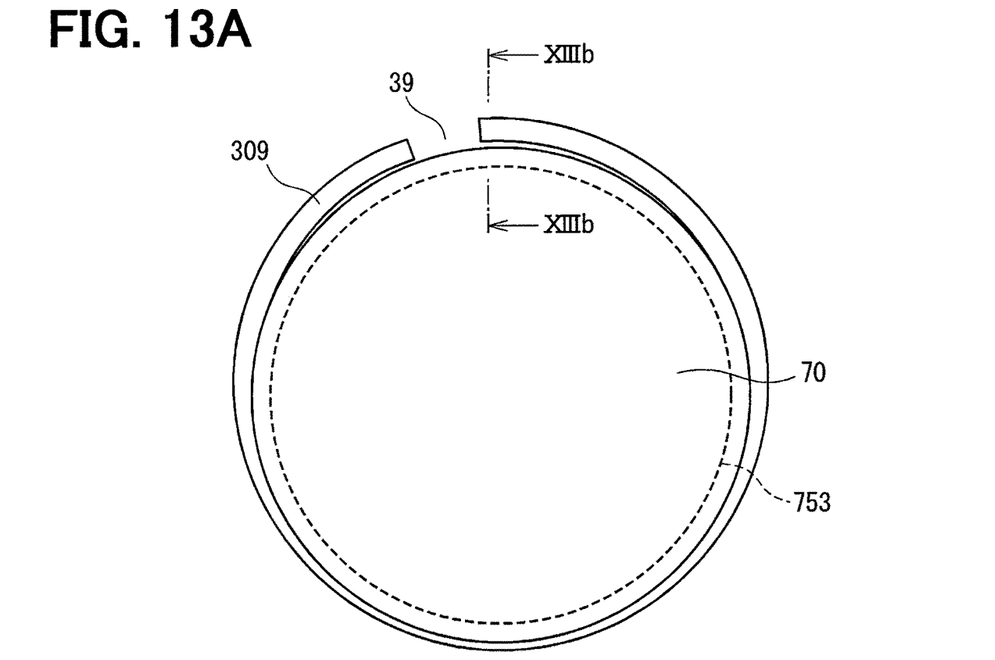
FIG. 13A is a diagram illustrating a front view for explaining an action of deforming a deformed resin seal ring from an outer peripheral groove of the valve.
Figure 13B:
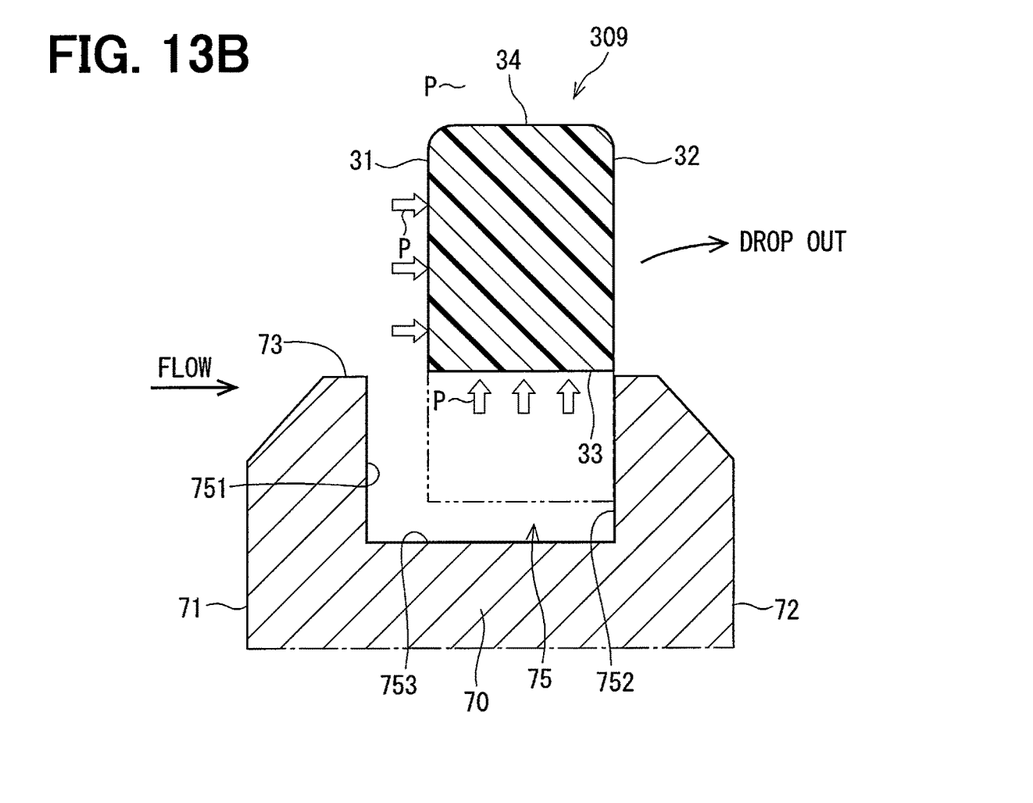
FIG. 13B is a diagram illustrating an enlarged cross sectional view taken along line XIIIb-XIIIb in FIG. 13A.

In FIG. 12B and FIG. 13B, the EGR gas flows in the Flow direction from the upstream side end surface 71 toward the downstream side end surface 72 of the valve 70. The valve outer peripheral groove 75 has a groove inner wall 751 on the upstream side, a groove inner wall 752 on the downstream side, and a groove bottom wall 753.

In a state in which the seal ring 309 is accommodated in the outer peripheral groove 75 as shown in FIG. 12B, the outer peripheral surface 34 of the seal ring 309 is positioned radially outside the outer peripheral surface 73 of the valve 70, and the inner peripheral surface 33 of the seal ring 309 is fitted inside the outer peripheral groove 75.

The pressure P of the gas flowing in the "Flow" direction acts on one end face 31 of the seal ring 309, and the other end face 32 is pressed against the groove inner wall 752 on the downstream side of the outer peripheral groove 75. The pressure P of the gas flowing into between the inner circumferential surface 33 of the seal ring 309 and the groove bottom wall 753 of the outer circumferential groove 75 acts so as to extend the inner circumferential surface 33 outward in the radial direction. Hereinafter, the pressure P acting radially outward from a side of the groove bottom wall 753 of the outer circumferential groove 75 to the inner circumferential surface 33 is referred to as "internal pressure".

In FIGS. 12A and 12B, when the rigidity of the seal ring 309 is not sufficient, the seal ring 309 which has received the internal pressure P deforms to enlarge the fitting opening 39 and expands its diameter.

As shown in FIGS. 13A and 13B, when the valve is opened so that the outer peripheral surface 34 of the seal ring 309 becomes free, the fitting opening 39 expands. Namely, the seal ring 309 moves radially outward, and may drop out from the outer peripheral groove. When the dropped out seal ring 309 bites between the valve 70 and the passage portion 81, the seal ring 309 may be broken or the valve 70 may be locked.

The effect of the composite seal ring 101 according to the first embodiment in comparison with the comparative example will be described with reference to FIGS. 4 and 5. The internal pressure P of the gas flowing in the flow direction acts on the one end surface 31 of the seal ring 301, and the other end surface 32 is pressed against the groove inner wall 752 on the downstream side of the outer circumferential groove 75.

Figure 4:
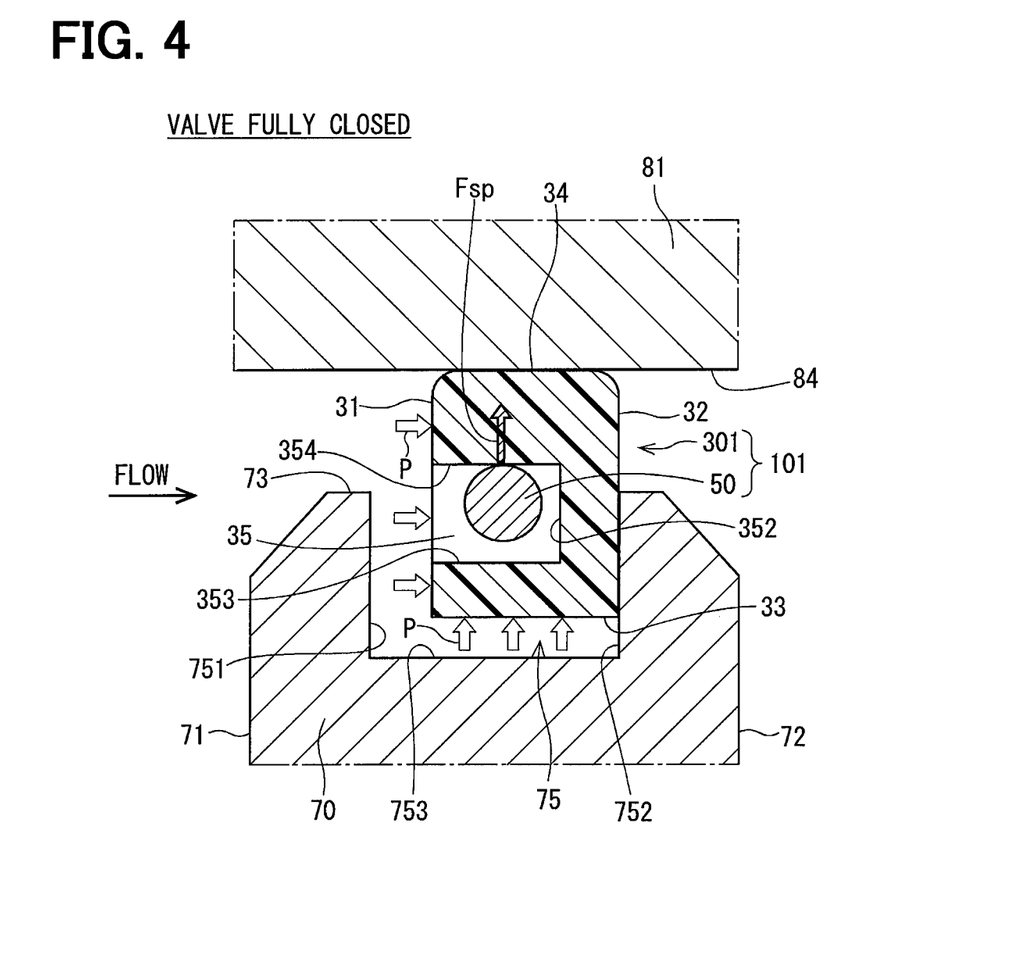
FIG. 4 is a diagram illustrating a schematic cross sectional view for explaining an action of the composite seal ring when a valve is fully closed.

In the fully closed state of the valve as shown in FIG. 4, the outer circumferential surface 34 of the seal ring 301 comes into contact with the inner wall 84 of the passage portion 81, and the radial expansion in the radially outward direction is suppressed. In addition, the pressure rises on a side of the inner peripheral surface 33 of the seal ring 301, and the pressure decreases on a side of the outer peripheral surface 34, whereby the internal pressure P due to the differential pressure is generated. At this time, the outer peripheral surface of the spring 50 abuts against the groove inner wall 354 on the radially outer side of the spring groove 35, and the spring force Fsp acts in the radially outward direction. As a result, the seal ring 301 is pressed against the inner wall 84 of the passage portion 81. Therefore, even when the tension of the seal ring 301 is lowered due to high-temperature creep, the sealing property at the time when the valve is full closed is secured.

Figure 5:
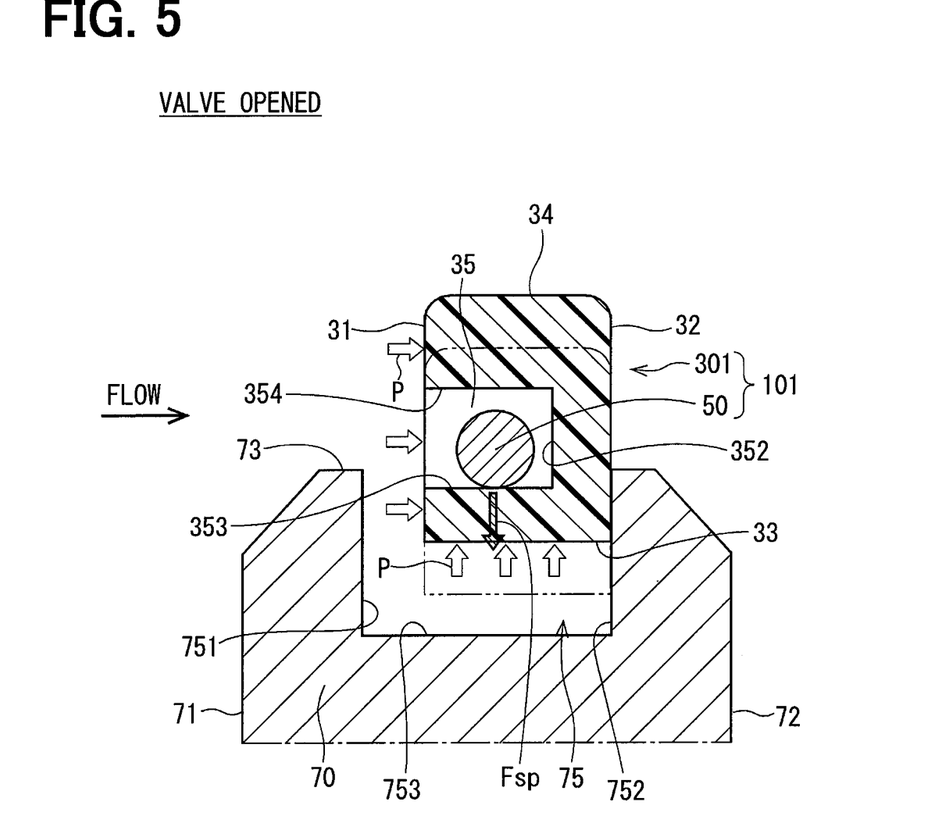
FIG. 5 is a diagram illustrating a schematic cross sectional view for explaining an action of the composite seal ring when a valve is opened.

On the other hand, when the valve is opened in FIG. 5, since the outer peripheral surface 34 of the seal ring 301 is in a free state, the seal ring 301 is pressed radially outward by the internal pressure P acting on the inner peripheral surface 33. At this time, the inner peripheral surface of the spring 50 abuts against the groove inner wall 353 on the radially inner side of the spring groove 35, and the spring force Fsp acts in the radially inward direction. As a result, the deformation of the seal ring 301 in the radially outward direction due to the internal pressure P is suppressed, and it is possible to prevent the seal ring 301 from dropping out from the outer circumferential groove 75. Therefore, it is possible to appropriately avoid occurrence of troubles such as breakage of the seal ring 301 and locking of the valve 70.

As described above, the metal spring 50 combined with the seal ring 301 made of a resin can press the seal ring 301 radially outwardly and radially inwardly due to the pressure P acting on the seal ring 301 or the deformation of the seal ring 301. Therefore, according to the composite seal ring 101 of the present embodiment, by setting the free diameter and tension of the metal spring 50, the rigidity against the internal pressure P can be ensured and the tension at high temperature can be secured. Accordingly, the problems occurred by the resin seal ring 309 in the comparative example, namely "dropping out from the outer peripheral groove 75 of the valve due to the internal pressure P" and "decrease in tension after high temperature creep" at a high temperature at which the resin rigidity is particularly low, can be solved.

Next, the composite seal rings of the second to sixth embodiments will be described with reference to FIGS. 6A to 9B. The front view in each embodiment corresponds to FIG. 3A in the first embodiment.

Similarly to the first embodiment, the composite seal ring in each embodiment secures the rigidity against the internal pressure by the metal spring 50 combined with the resin seal rings 302 to 306 and can prevent it from dropping out from the outer peripheral groove 75 of the valve. In addition, the tension after high temperature creep can be secured.

Second Embodiment

Figure 6A:
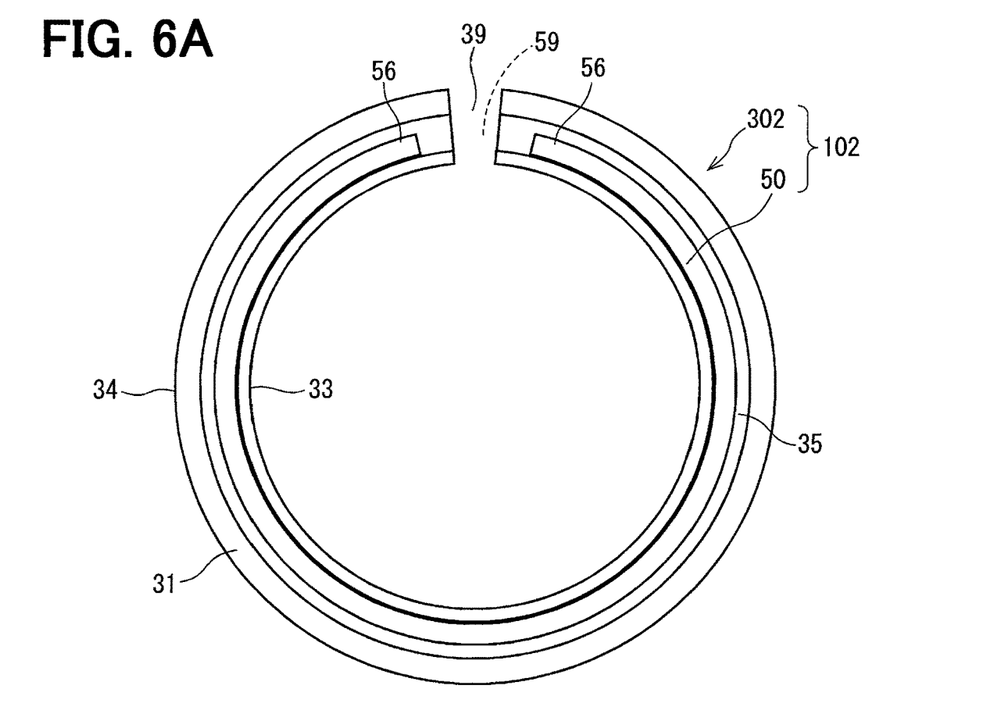
FIG. 6A is a front view showing a state in which fitting openings of the composite seal ring are arranged at a same position in a second embodiment.
Figure 6B:
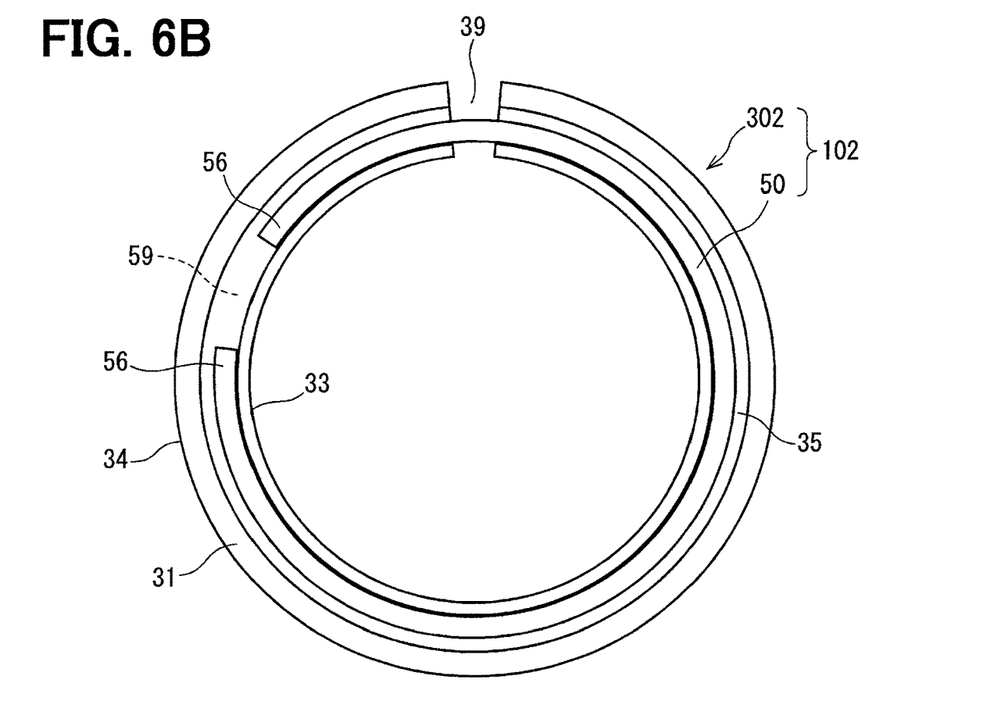
FIG. 6B is a front view showing a state in which fitting openings of the composite seal ring are arranged at different positions in the second embodiment.

The second embodiment is explained with reference to FIG. 6A and FIG. 6B.

In the composite seal ring 102 of the second embodiment, the circumferential end walls 36 are not formed at both circumferential end portions of the seal ring 302 with respect to the first embodiment. Therefore, the spring 50 is freely movable in the circumferential direction. FIG. 6A shows a state in which the fitting opening 59 of the spring 50 and the fitting opening 39 of the seal ring 302 are arranged at a same position, and FIG. 6B shows a state in which the fitting 59 of the spring 50 and the fitting opening 39 of the seal ring 302 are arranged at different positions.

In the second embodiment, since the spring 50 can freely move, the stress caused by the collision between the spring 50 and the seal ring 302 is reduced.

Third Embodiment

Figure 7:
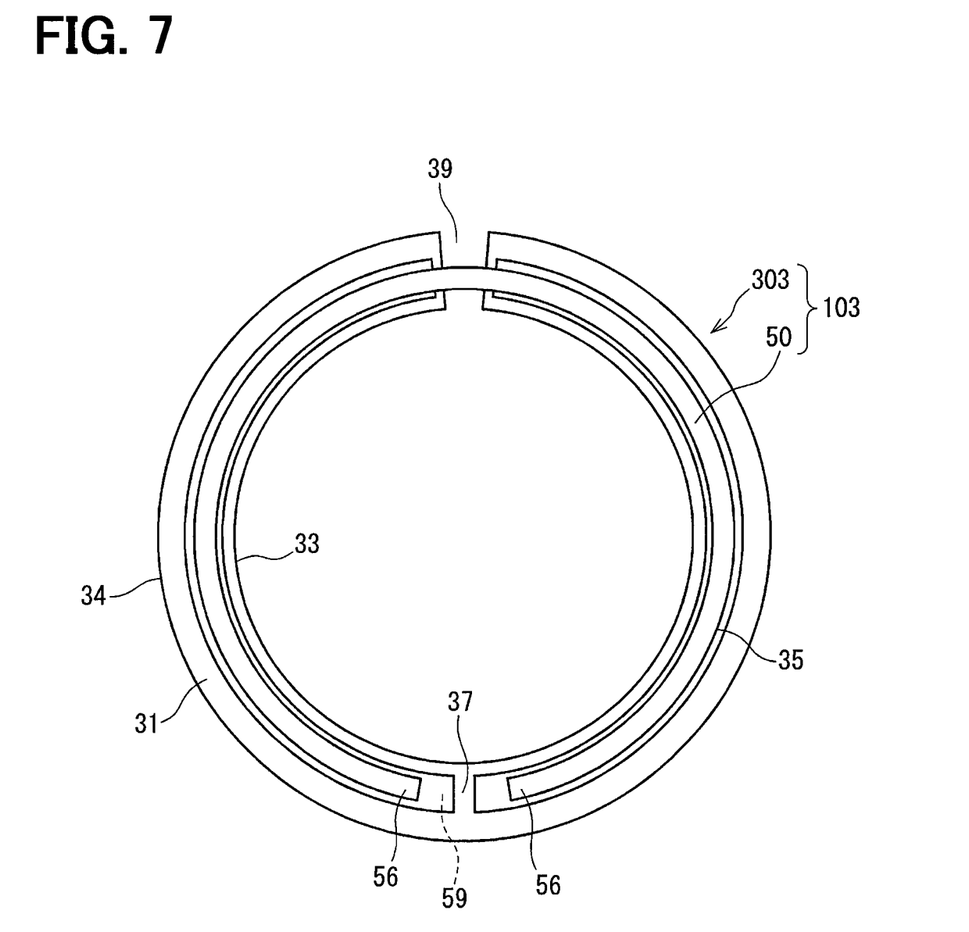
FIG. 7 is a diagram illustrating a front view of a composite seal ring in a third embodiment.

The third embodiment is explained with reference to FIG. 7.

In the composite seal ring 103 of the third embodiment, a partition wall 37 is formed on the side opposite to the fitting opening 39 of the seal ring 303 in the circumferential direction. The spring 50 is accommodated in the spring groove 35 such that the partition wall 37 is interposed in the fitting opening 59. Therefore, the fitting opening 39 of the seal ring 303 faces the portion of the spring 50 which is opposite to the fitting opening 59.

In the third embodiment, since the relative movement of the spring 50 with respect to the seal ring 303 is suppressed as in the first embodiment, the abrasion of the seal ring 303 due to the sliding of the spring 50 is suppressed. Furthermore, since the fitting opening 39 of the seal ring 303 and the fitting opening 59 of the spring 50 are arranged at the different positions in the circumferential direction, the deformation of the composite seal ring 103 as a whole is suppressed, and the dropping out from the valve outer circumferential groove 75 is prevented. Further, the surface pressure in the circumferential direction can be brought close to uniform.

Fourth Embodiment

The fourth embodiment is explained with reference to FIG. 8.

In the composite seal ring 104 of the fourth embodiment, a plurality of contact portions 38 that protrude in the radial direction from the groove inner walls 353, 354 of the spring groove 35 of the seal ring 304 are formed with respect to the composite seal ring 101 of the first embodiment. The contact portion 38 projecting radially outward from the groove inner wall 353 contacts against the inner peripheral surface of the spring 50 and the contact portion 38 projecting radially inward from the radially outer groove inner wall 354 is in contact with the spring 50. As a result, the positions where the contact portions 38 are provided are specified as the surface pressure generation portion generated by the spring 50.

In the fourth embodiment, the contact portions 38 are specified irrespective of dimensional variations and shape accuracy of the spring groove 35 and the spring 50, and the contact pressure can be stabilized. Further, since the spring 50 is fixed, the abrasion of the seal ring 304 due to the sliding of the spring 50 is more reliably suppressed.

Figure 8:
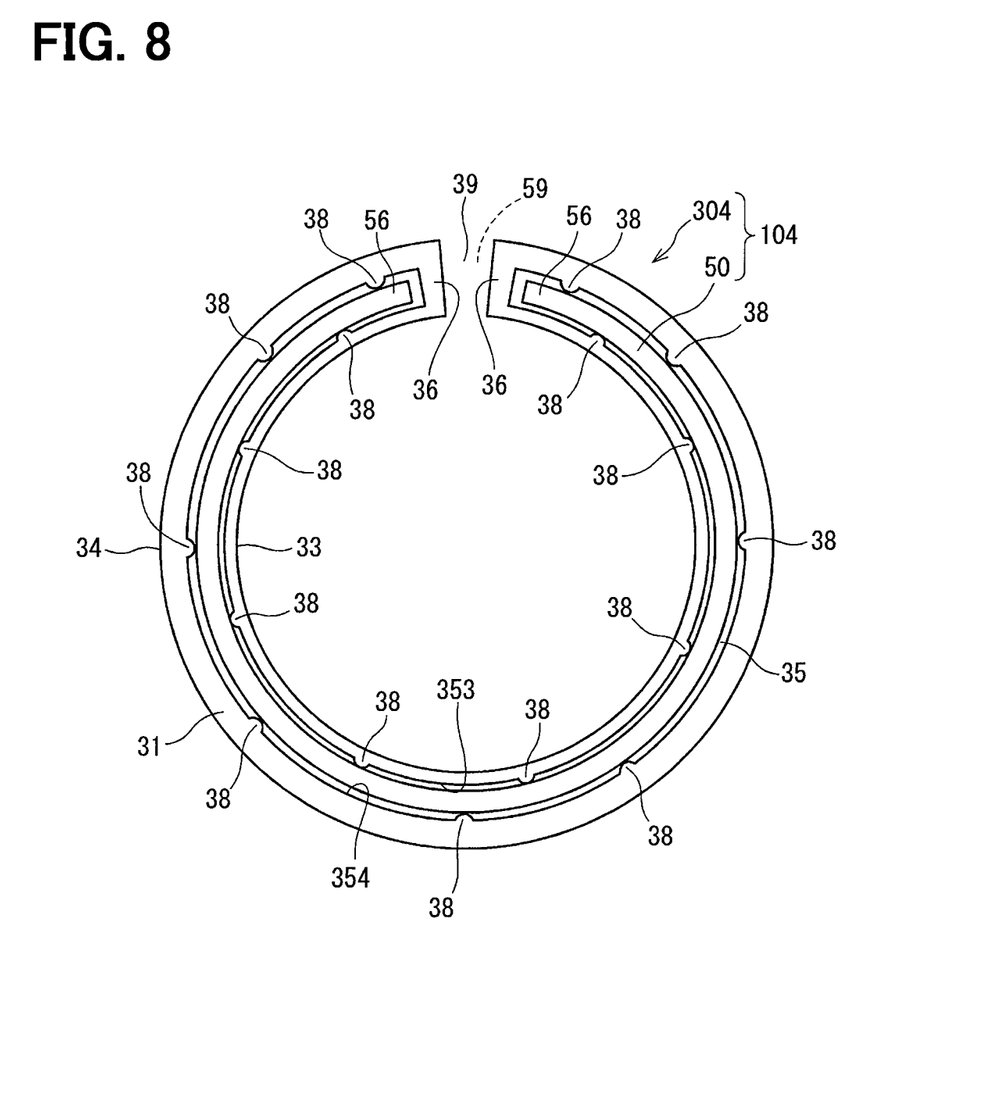
FIG. 8 is a diagram illustrating a front view of a composite seal ring in a fourth embodiment.

In the example of FIG. 8, according to the first embodiment, although the fitting opening 39 of the seal ring 304 and the fitting opening 59 of the spring 50 are arranged at the same position in the circumferential direction, but the configuration of the contact portions 38 may be applied to the third embodiment in which the fitting openings 39, 59 are arranged at different positions in the circumferential direction.

Further, in the modification of the fourth embodiment, the contact portions 38 may be formed only on the groove inner wall 353 on the radially inner side of the spring groove 35 or only on the groove inner wall 354 on the radially outer side.

Fifth Embodiment

Figure 9A:
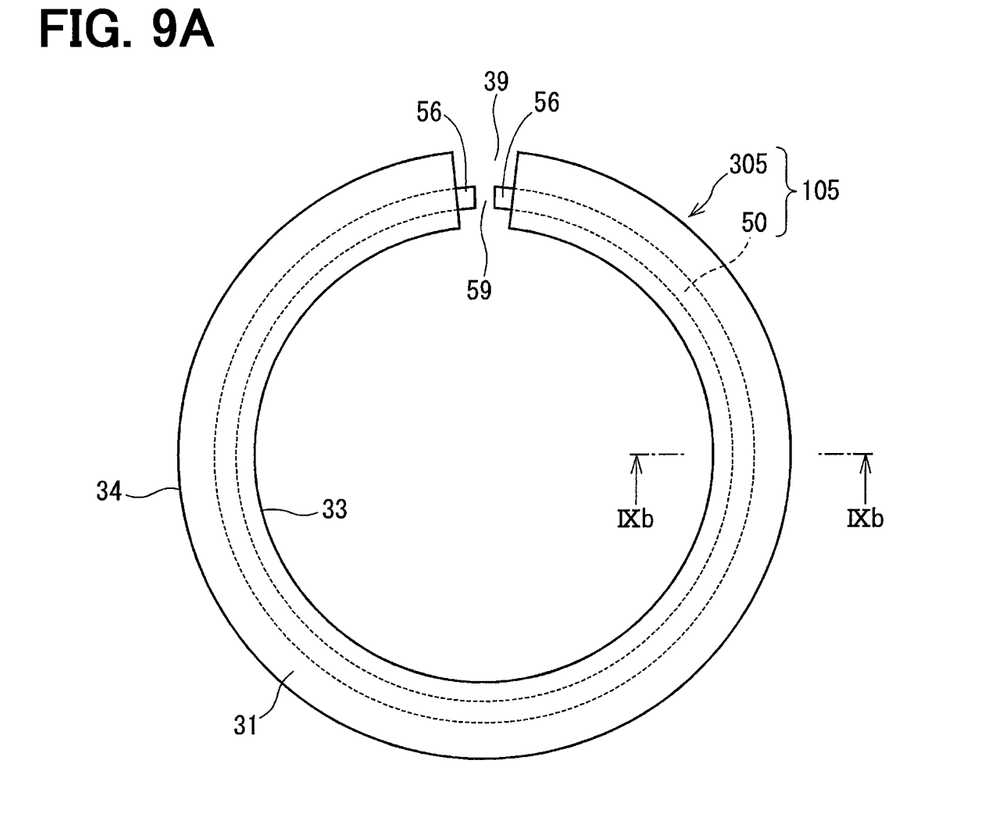
FIG. 9A is a diagram illustrating a front view of a composite seal ring in a fifth embodiment.
Figure 9B:
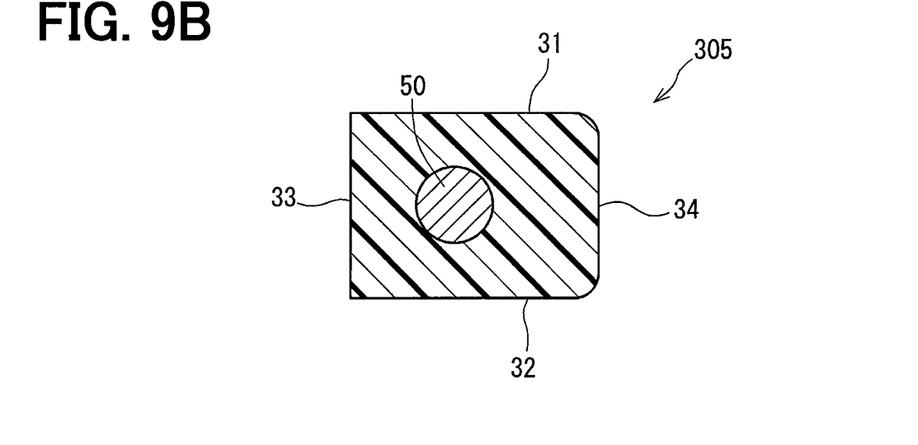
FIG. 9B is a diagram illustrating an enlarged cross sectional view taken along line IXb-IXb in FIG. 9A.

The fifth embodiment is explained with reference to FIGS. 9A and 9B.

In the composite seal ring 105 of the fifth embodiment, at least a part of the spring 50 is embedded in the seal ring 305. Typically, the spring 50 is insert-molded to be molded into the seal ring 305. The spring 50 is annularly arranged within the range of the radial width of the seal ring 305 by being embedded in the seal ring 305.

In the fifth embodiment, since the spring 50 is embedded and fixed, the abrasion of the seal ring 354 due to sliding of the spring 50 is suppressed, and in addition, it is prevented that the install of the spring 50 in the parts management stage is forgotten and the spring 50 is prevented from dropping out of the spring groove 35.

In addition, the circumferential end portion 56 facing the fitting opening 59 of the spring 50 is exposed from the fitting opening 39 of the seal ring 305. Since the circumferential end portion 56 of the spring 50 is released, the thermal stress can be alleviated.

Sixth Embodiment

Figure 10A:
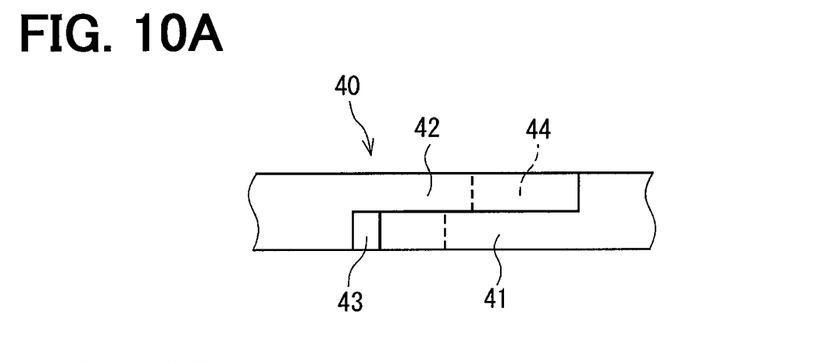
FIG. 10A is a diagram illustrating an expanded view of a composite seal ring in a direction of arrow Xa in FIG. 10B in a sixth embodiment.
Figure 10B:
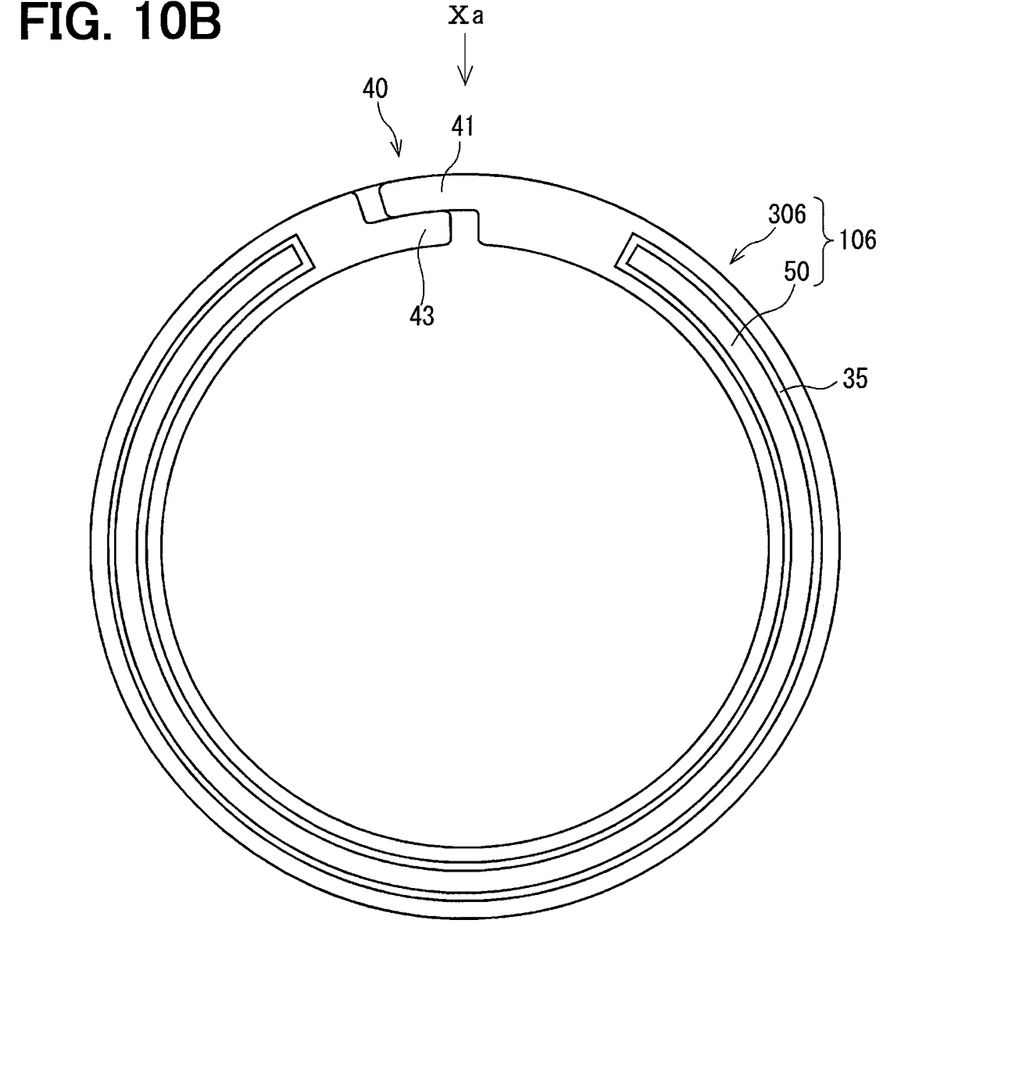
FIG. 10B is a diagram illustrating a front view of the composite seal ring in FIG. 10A.

The sixth embodiment is explained with reference to FIGS. 10A and 10B.

The seal ring 306 in the composite seal ring 106 of the sixth embodiment is formed such that both circumferential end portions overlap in the radial direction and the axial direction at the fitting opening 39 of the seal ring 301 of the first embodiment.

The fitting opening 40 of the seal ring 306 is composed of engaging pieces 41, 42 extending from one end portion and the other end portion on the radially outer side, and engaged pieces 43, 44 corresponding to the respective engaging pieces 41, 42 on the radially inner side. The engaging piece 41 and the engaged piece 43, the engaging piece 42 and the engaged piece 44 respectively overlap in the radial direction, and the engaging piece 41 and the engaged piece 42 overlap in the axial direction. Thus, when the valve is fully closed, the gap of the fitting opening 40 can be suitably brought into close contact, and the sealing performance can be improved.

Furthermore, as disclosed in Japanese Patent Publication No. 2017-89675, a lap joint overlapping in a wide area in the axial direction may be provided, as a modification of the sixth embodiment.

The configuration of the gaps in the sixth embodiment and the modifications may be applied to the second to fifth embodiments.

Other Embodiments

The composite seal ring of the present disclosure is not limited to the EGR valve device but may also be applied to throttle valve devices through which intake gas flows, various on-off valves using butterfly valves, flow regulating valves, pressure regulating valves, and the like.

As described above, the present disclosure is not limited to the above embodiment at all and may be implemented in various modes without departing from the gist of the disclosure.

What is claimed is:

1. A composite seal ring, comprising:
   a resin seal ring configured to be attached in an outer peripheral groove of a valve that opens and closes a passage by a rotational displacement, and configured to seal between an inner wall of the passage and the valve, in a fully closed state of the valve, wherein the resin seal ring comprises an annular groove; and
   a spring that is metal, disposed within the annular groove, and configured to press the resin seal ring radially outwardly and radially inwardly due to a pressure acting on the resin seal ring or a deformation of the resin seal ring; wherein in a radial direction, there this is a first gap between a radial outer circumference of the spring and a radial outer circumference of the annular groove, and a second gap between a radial inner circumference of the spring and a radial inner circumference of the annular groove.

2. The composite seal ring according to claim 1, wherein the annular groove is formed on an end surface in an axial direction of the resin seal ring.

3. The composite seal ring according to claim 2, wherein each of the resin seal ring and the spring has a fitting opening in one place in a circumferential direction, and the fitting opening of the resin seal ring and the fitting opening of the spring are arranged at a same position in the circumferential direction.

4. The composite seal ring according to claim 3, wherein at least a part of the spring is embedded in the resin seal ring.

5. The composite seal ring according to claim 4, wherein a circumferential end portion of the spring facing the fitting opening is exposed from the resin seal ring.

6. The composite seal ring according to claim 2, wherein each of the resin seal ring and the spring has a fitting opening in one place in a circumferential direction, and the fitting opening of the resin seal ring and the fitting opening of the spring are arranged at a different position in the circumferential direction.

7. The composite seal ring according to claim 2, wherein a contact portion extends radially from a groove inner wall of the annular groove so as to contact at least one of an inner surface and an outer surface of the spring.

8. The composite seal ring according to claim 2, wherein in the fully closed state of the valve, an outer circumferential surface of the resin seal ring comes into contact with the inner wall, and an outer peripheral surface of the spring abuts against an inner wall on a radially outer side of the annular groove, and in an opened state of the valve, an inner peripheral surface of the spring abuts against an inner wall on an inner side in the radial direction of the annular groove.

9. The composite seal ring according to claim 1, wherein the annular groove is C-shaped such that circumferential end walls are formed at both circumferential ends of the annular groove;

the metal spring is C-shaped such that there is a first gap between one end of the spring and one circumferential end wall, and there is second gap between the other end of the spring and the other circumferential end wall; and movement of the spring is restricted by the circumferential end walls.

10. The composite seal ring according to claim 1, wherein the resin seal ring is split to include an opening, an engaging piece and an engaged piece; and the engaging piece and the engaged piece overlap in a radial direction.

11. The composite seal ring according to claim 1, wherein in the fully closed state of the valve, an outer circumferential surface of the seal ring is configured to come into contact with the inner wall and radial expansion in a radially outward direction is suppressed.

12. The composite seal ring according to claim 1, wherein the metal spring is configured to provide a radially inward force by abutting against a surface of the annular groove when an outer peripheral surface of the seal ring is in a free state and the seal ring is pressed radially outward by pressure.

13. A composite seal ring for use with a butterfly valve that includes a body with a passage that includes an inner wall, a valve within the body that opens and closes the passage by a rotational displacement and that includes an outer peripheral groove, the composite seal ring comprising a resin seal ring configured to be attached in the outer peripheral groove and configured to seal between the inner wall and the valve, in a fully closed state of the valve, wherein the resin seal ring comprises an annular groove; and a solid metal spring disposed within the annular groove, and configured to press the resin seal ring radially outwardly and radially inwardly due to a pressure acting on the resin seal ring or a deformation of the resin seal ring.

14. The composite seal ring according to claim 13, wherein the resin seal ring comprises a first gap in a circumferential direction of the resin seal ring, the solid metal spring comprises a second gap in a circumferential direction of the solid metal spring, and the first gap and the second gap have different circumferential distances.

15. The composite seal ring according to claim 14, wherein two ends of the solid metal spring adjacent the second gap extend into the first gap.

16. The composite seal ring according to claim 14, wherein two ends of the solid metal spring adjacent the second gap do not extend into the first gap.

17. A valve assembly comprising the composite seal ring according to claim 13 and the butterfly valve, wherein the composite seal ring is attached in the outer peripheral groove.

* * * * *